United States Patent [19]

Kamon et al.

[11] Patent Number: 5,227,099
[45] Date of Patent: Jul. 13, 1993

[54] METHOD FOR PRINTING ON SYNTHETIC RESIN MOLDED BODY AND HEADPHONE HOUSING ON WHICH PRINTING HAS BEEN MADE BY THE METHOD

[75] Inventors: Yoshiyuki Kamon; Masahiko Iso, both of Kanagawa; Takayuki Ishii, Chiba, all of Japan

[73] Assignee: Sony Corporation, Japan

[21] Appl. No.: 734,735

[22] Filed: Jul. 23, 1991

[30] Foreign Application Priority Data

Jul. 31, 1990 [JP] Japan .................. 2-203519

[51] Int. Cl.⁵ ............................................. B29C 67/22
[52] U.S. Cl. .......................................... 264/25; 264/51; 264/53; 264/132; 264/245
[58] Field of Search ............. 427/53.1; 264/25, 51, 264/53, 132, 245

[56] References Cited

U.S. PATENT DOCUMENTS

| | | |
|---|---|---|
| 3,368,014 | 2/1968 | Tijunelis .................. 264/132 |
| 3,627,858 | 12/1971 | Parts et al. .................. 264/25 |
| 3,949,028 | 4/1976 | Murakami et al. .................. 264/22 |
| 4,032,691 | 6/1977 | Kido et al. .................. 428/304 |
| 4,092,518 | 5/1978 | Merard .................. 264/132 |
| 4,096,218 | 6/1978 | Yasuike et al. .................. 264/53 |
| 4,260,575 | 4/1981 | Thew et al. .................. 264/154 |
| 4,407,768 | 10/1983 | Garcia et al. .................. 264/53 |
| 4,507,346 | 3/1985 | Maurer et al. .................. 428/158 |
| 4,559,367 | 12/1985 | Hurps et al. .................. 264/53 |
| 4,710,330 | 12/1987 | Lewandowski et al. .................. 264/132 |

Primary Examiner—Allan R. Kuhns
Attorney, Agent, or Firm—Ronald P. Kananen

[57] ABSTRACT

A method for printing a letter, character or a figure on an inner ear type headphone, which is a molded body of a thermoplastic synthetic resin, by irradiating the surface with a laser light, and a headphone housing on which the letter etc. has been printed by the above method. The printing is performed by irradiating the surface of the synthetic resin molded body with a laser light for expanding any moisture or air contained in the molded body for foaming the surface. Printing is achieved in the form of foamed regions of the synthetic resin and hence is clear and superior in abrasion resistance and durability.

8 Claims, 1 Drawing Sheet

METHOD FOR PRINTING ON SYNTHETIC RESIN MOLDED BODY AND HEADPHONE HOUSING ON WHICH PRINTING HAS BEEN MADE BY THE METHOD

BACKGROUND OF THE INVENTION

1. Field of the Invention

This invention relates to a method for printing on a molded body of a thermoplastic synthetic resin and a headphone housing on the surface of which printing has been made by the printing method.

2. Description of the Related Art

Heretofore, as a method for printing on a molded body of a synthetic resin, such as an inner ear type headphone housing or a keytop of a keyboard device, a printing method such as a silk screen printing has been extensively applied. The silk screen printing method includes the steps of transfer printing a letter, character or a figure on the surface of a synthetic resin molded body with a thermosetting ink, such as an epoxy resin, white pigment or a silver white pigment, and heat setting said ink for burning and printing the letter etc. on the surface of the molded body.

With the letter or figure, obtained by such printing method, since the thermosetting ink is simply applied to the surface of the molded body, it is easily abraded by friction or peeled off during handling and thus becomes hardly visible.

For overcoming such inconvenience, there is also known a printing method which makes use of a laser light. With this method, a coating of aluminum, for example, is formed on the surface of a synthetic resin molded body by vacuum deposition and the coating is irradiated with the laser light for selectively removing the coating after the contour corresponding to the desired letter, figure etc. to expose the underlaying surface of the molded body to effect printing.

There is additionally known a printing method in which the surface of the synthetic resin molded body is irradiated with a laser light to remove the surface of the molded body by engravure so that removed portions represent a predetermined letter, figure or the like.

With these prior-art printing method by the laser, printing with excellent abrasion resistance and durability may be achieved. However, with the printing method in which the aluminum coating is applied on the surface of the molded body and the coating is selectively removed by engravure for printing, the printing process is complex and expensive. On the other hand, with the printing method of removing the surface of the molded body by engravure, the printing is of the same color as the molded body and hard to see or indistinguishable from the background.

OBJECT AND SUMMARY OF THE INVENTION

It is an object of the present invention to provide a printing method by the laser light enabling clear, aesthetic and distinguishable printing durably and easily.

It is another object of the present invention to provide a headphone housing on which clear, aethetic and durable printing has been made in a manner readily distinguishable from the background.

With the printing method in accordance with the present invention, in view of the properties of a thermoplastic synthetic resin of foaming on high heat application, a laser light is irradiated on the surface of the a molded body of the thermoplastic synthetic resin for foaming the surface of the molded body for printing a letter, figure or the like.

With the present printing method, the laser light is irradiated on the surface of the molded body of a thermoplastic synthetic resin and, when the surface irradiated with the laser light is heated to higher than the melting point of the resin, any moisture or air contained in the molded body are expanded to generated air bubbles. The resulting foamed portions present a color different from the unfoamed portions and thus become the printed portions conforming to the predetermined letters, figures or the like.

Other objects and advantages of the present invention will become more apparent from the following description of a certain illustrative embodiment of the present invention.

DETAILED DESCRIPTION OF PREFERRED EMBODIMENT

An illustrative embodiment of the present invention will be explained in detail.

For application of the letter printing method of the present invention, a thermoplastic synthetic resin is processed by molding, such as injection molding or compression molding, to produce a molded body of a desired shape.

The molded body, to which the present invention is applied, is produced from a thermoplastic synthetic resin. Such synthetic resin used for forming the molded body is a head-resistant resin having a melting point not lower than 120° C., such as ABS resin, acrylic resin, polycarbonate resin or AS resin. More specifically, an ABS resin prepared and sold by Mitsubishi rayon Co. Ltd. under the trade name of "Diapet ABS", grade HF-5 or HF-3, may be preferably employed.

Figure 1:
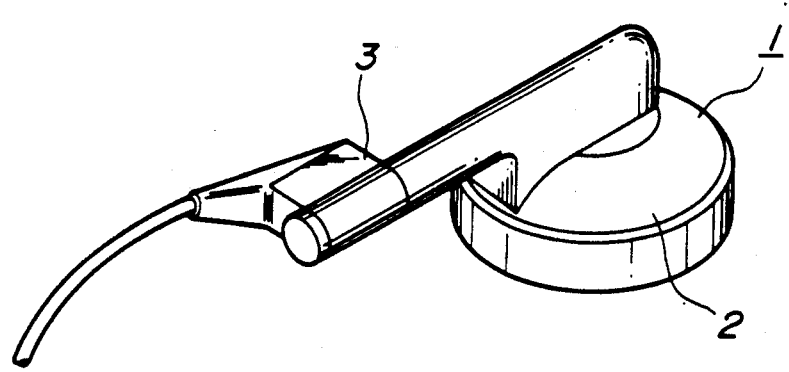
FIG. 1 is a perspective view showing a housing of an inner ear type headphone as a synthetic resin molded body to which a letter printing method according to the present invention is applied.
Figure 2:
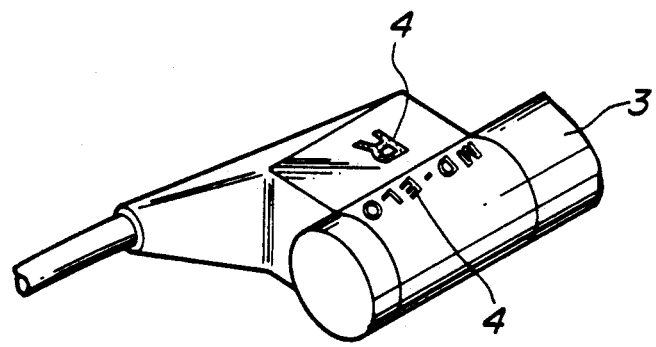
FIG. 2 is a perspective view showing an example of printing a letter on a cord holding part of the housing.
Figure 3:
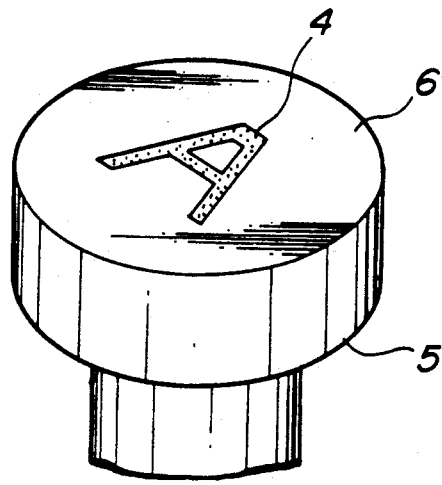
FIG. 3 is a perspective view showing an example of printing a letter on a key top of a keyboard device.

The above ABS resin is processed by injection molding to produce an inner ear type (or auricle inserting type) headphone housing 1, as shown in FIG. 1.

This housing 1 is a unitary molded body which is made up of a speaker unit housing section 2 for housing a speaker unit and a cord holding section 3 through which is inserted an outer extension cord adapted for supplying acoustic signals to the speaker unit accommodated in the housing section 2.

A laser light is irradiated on the outer peripheral surface of the cord holding section 3 of the housing 1 so as to be in correspondence with a desired letter, figure or the like. That is, using a laser irradiating device, such as a laser marker, the laser light is irradiated at a letter printing position of the cord holding section 3 so as to be in correspondence with a desired letter, figure etc. The region irradiated with the laser light is now softened due to heating by the laser light to a temperature not lower than the melting point of the ABS resin of the cord holding section 3. On laser light irradiation and softening in this manner, any moisture and air contained in the ABS resin is expanded and foamed. The laser light suitable for such synthetic resin is the Nd: YA laser having a wavelength of 1.06 μm.

The regions of the molded body where the laser light is irradiated are foamed and changed to a color tint which is a color mixture of, for example, a color due to the difference in density from an unirradiated region, a color due to burning by the laser light, and so forth. The irradiated regions are also relieved by a volume corresponding to expansion and foaming. These relieved portions become letters in relief representative of a letter, figure etc. of a desired contour.

In the above embodiment, a letter or a figure is produced on the outer periphery of the cylindrical cord holding section 3 of the headphone housing 1. However, since the letter or figure may be formed on the molded body in a non-contact fashion by the laser light as described above, it may also be formed on the bottom surface of a recess such as a pressure surface 6 on a key top 5 of a keyboard device.

The thermoplastic synthetic resin material constituting the molded body employed in the present method may be any synthetic resin provided that moisture or air contained therein may be expanded and foamed on irradiation of the laser light and air bubbles produced on expansion are not liable to explosion. Thus the resin material may include acrylic resins, polycarbonate resins and AS resins, besides the above mentioned ABS resin. In order to prevent the air bubbles from being exploded, it is preferred to employ resin materials exhibiting a high degree of viscosity at the melting point of the resin.

The printing region is not limited to a smooth surface, but may be a rough satinized surface. Since the letter or figure printing by the inventive method is achieved by changes in color tint due to foaming of the synthetic resin constituting the molded body, letter or figure printing may be made by changes in color produced by foaming of the synthetic resin constituting the molded body. Even though the printing surface is a rough satinized surface, color difference is produced between the irradiated and unirradiated regions to effect printing.

Since letter or figure printing, achieved by the present invention, is by foaming of the synthetic resin molded body, the produced letter or figure becomes as one with the molded body. Thus the letter or figure may be positively safeguarded against peeling due to contact with hand or figure and are excellent in abrasion resistance and durability. In addition, those portions relieved by foaming may be clearly distinguished from the remaining portions to form clear printed letters or figures. Since the printing is formed by expansion and foaming of the synthetic resin, a sufficient abrasion resistance and durability may be assured even when printing is made on surfaces frequently contacted by hand or ginger, such as an inner ear type headphone or key top, while the printed letter or figure is clear and easy to view without fatigue.

Since printing on the synthetic resin is by means of the laser light, printing may be made on three-dimensional surfaces, such as cylindrical or recessed surfaces without constraints as to the printing surfaces, and hence versatile in practical application.

Finally, since letter or figure printing is achieved solely by laser light irradiation on the surface of the molded body, the printing process is simplified at low costs.

What is claimed is:

1. A method for printing a letter or a figure on the surface of a molded body of a thermoplastic synthetic resin, comprising
    irradiating a predetermined area of said molded body with a laser light to expand any moisture or air contained in said molded body, in the absence of another blowing agent, to foam said surface to produce color changes in said area and to cause said surface to be expanded and relieved.

2. The method as claimed in claim 1 wherein said molded body is of a synthetic resin having a melting point of not lower than 120° C.

3. The method as claimed in claim 1 wherein said laser light is an Nd-YAG laser having a wavelength of 1.06 μm.

4. The method as claimed in claim 1 wherein said predetermined area on said surface of said molded body is softened by heating to 120° C. or higher to expand any moisture and air contained in the molded body to cause said surface to be expanded and relieved.

5. The method as claimed in claim 2, wherein said thermoplastic synthetic resin is selected from the group consisting of ABS resin, acrylic resin, polycarbonate resin and AS resin.

6. A method for printing a letter or a figure on the surface of a molded body of a thermoplastic synthetic resin comprising, irradiating a predetermined area of said molded body with a laser light to expand any moisture or air contained in said molded body, in the absence of another blowing agent, to foam said surface to produce color changes in said area and to cause said surface to be expanded and relieved and wherein said thermoplastic synthetic resin is selected from the group consisting of ABS resin, acrylic resin, polycarbonate resin and AS resin.

7. The method as claimed in claim 6, wherein said laser light is an Nd-YAG laser having a wavelength of 1.06 μm.

8. The method as claimed in claim 6, wherein said predetermined area on said surface of said molded body is softened by heating to 120° C. or higher to expand any moisture and air contained in the molded body to cause said surface to be expanded and relieved.

* * * * *